Oct. 11, 1938.    F. S. SMITH    2,132,703
ELECTRICAL TREATING APPARATUS ESPECIALLY FOR STERILIZATION
Original Filed Oct. 8, 1934    4 Sheets-Sheet 1

INVENTOR
FRANKLIN S. SMITH
BY
Blair, Curtis + Dunne
ATTORNEYS

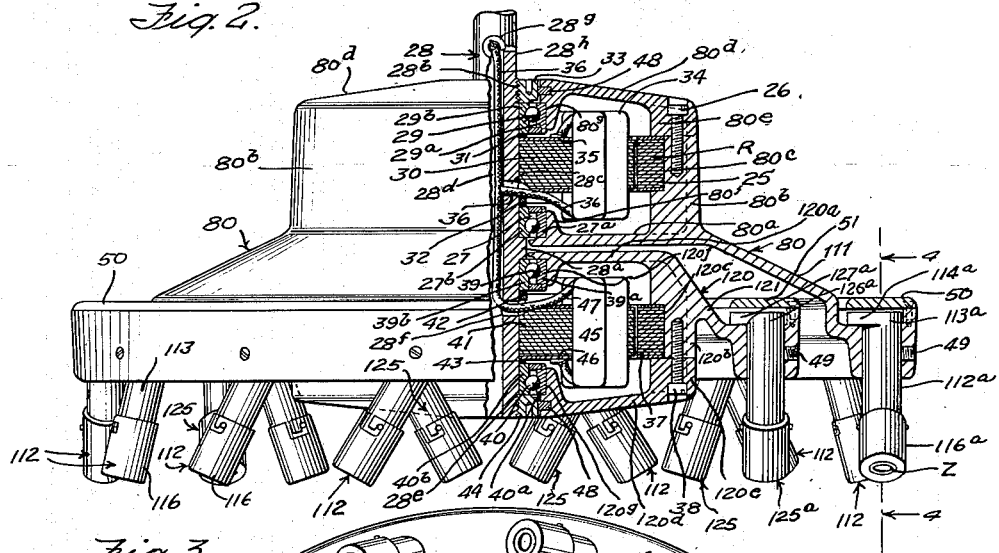

Oct. 11, 1938.  F. S. SMITH  2,132,703
ELECTRICAL TREATING APPARATUS ESPECIALLY FOR STERILIZATION
Original Filed Oct. 8, 1934   4 Sheets-Sheet 3
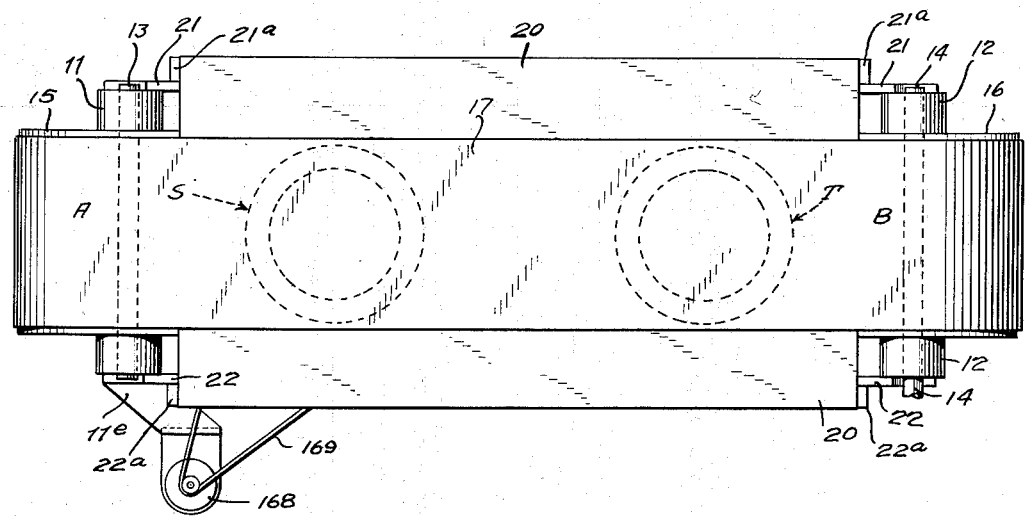
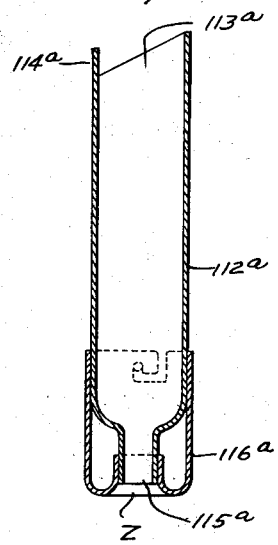
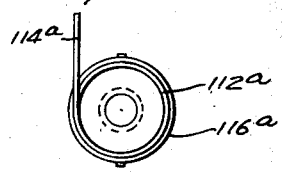
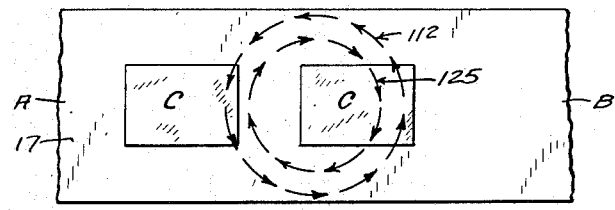
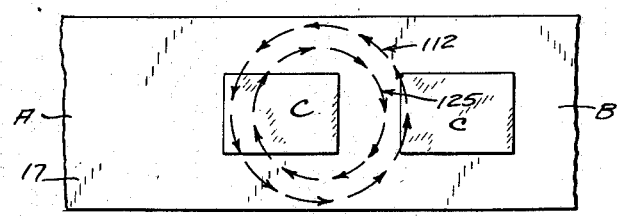
INVENTOR
FRANKLIN S. SMITH.
BY
Blair, Curtis + Dunne
ATTORNEYS Oct. 11, 1938.     F. S. SMITH     2,132,703
ELECTRICAL TREATING APPARATUS ESPECIALLY FOR STERILIZATION
Original Filed Oct. 8, 1934     4 Sheets-Sheet 4
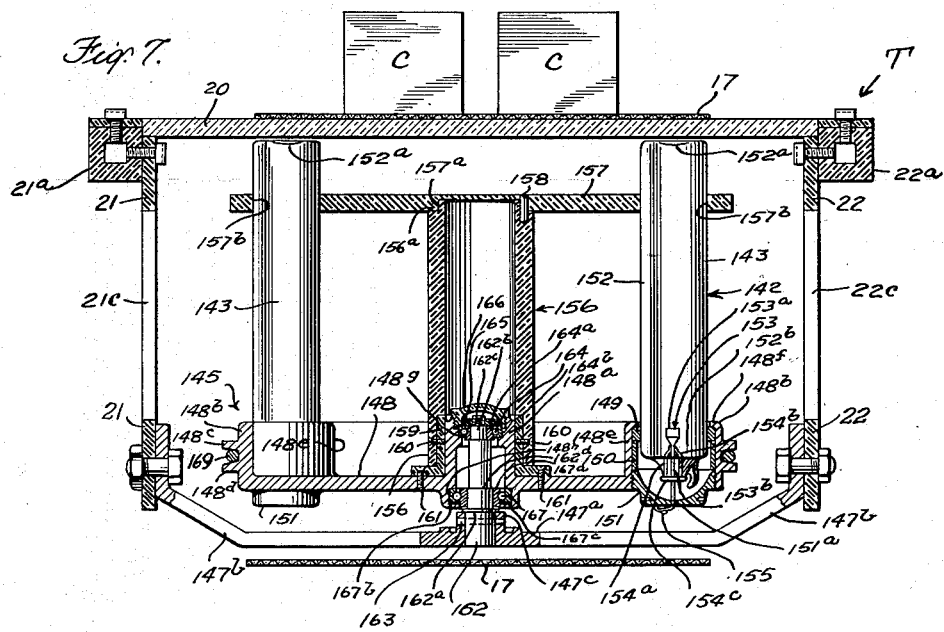
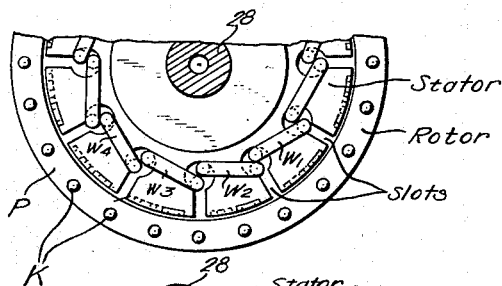
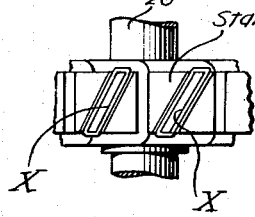
INVENTOR
FRANKLIN S. SMITH
BY
Blair, Curtis, Dunne
ATTORNEYS Patented Oct. 11, 1938

2,132,703

UNITED STATES PATENT OFFICE 2,132,703

ELECTRICAL TREATING APPARATUS, ESPECIALLY FOR STERILIZATION

Franklin S. Smith, New Haven, Conn.

Application October 8, 1934, Serial No. 747,437
Renewed October 17, 1936

29 Claims. (Cl. 21—102)

This invention relates to apparatus which is particularly adapted for destroying insect life in food and other products.

One of the objects of this invention is to provide apparatus which may be used for treating materials and which is admirably adapted for use in subjecting food and other products that contains insects and/or the eggs, larvae and pupae thereof to thoroughly practical and efficient treatment for destroying such insect life. Another object is to provide apparatus for electrically destroying such life in a thoroughly dependable, rapid and efficient manner. Another object is to provide apparatus of the above-mentioned character for destroying insect life in food and other products in a rapid and dependable manner without harming the product undergoing treatment. Another object is to provide apparatus of the above-mentioned character which is simple and compact in construction, and thorough and dependable in operation. Another object is to provide a compact, simple, inexpensive and reliable electrode structure and driving means therefor, for use in and coaction with apparatus of the above-mentioned character. Another object is to provide a dependable and efficient electrode construction capable of efficient and dependable action in practical use. Another object is to provide an electrode tip or electrode construction in which dependable and reliable control of the discharge therefrom is achieved. Other objects will be in part obvious or in part pointed out hereinafter.

This application is a continuation in part of my co-pending application Serial No. 627,291, filed August 2, 1932, renewed December 27, 1933, issued October 9, 1934, as Patent No. 1,975,805.

The invention accordingly consists in the features of construction, combinations of elements, and arrangements of parts as will be exemplified in the structure to be hereinafter described and the scope of the application of which will be indicated in the following claims.

In the accompanying drawings in which are shown several of the various possible embodiments of my invention;

Figure 2 is a front elevation, on an enlarged scale, partly in central vertical section, of an electrode structure and drive therefor, as may be employed in the apparatus of Figure 1;

Figure 3 is a bottom plan view, as seen from the bottom in Figure 2, of the electrode structure of the latter;

Figure 4 is a detached vertical sectional view, on a larger scale, of one of the electrode members of Figures 2 and 3, and others, being more specifically a vertical sectional view on an enlarged scale, as seen along the line 4—4 of Figure 2;

Figure 5 is an elevation, as seen from the top of Figure 4;

Figure 6 is a detached elevation of the package or product carrying or conveying apparatus and related parts, being more specifically a plan view, as seen along the line 6—6 of Figure 1;

Figure 7 is a vertical sectional view, on an enlarged scale, as seen along the line 7—7 of Figure 1, showing an illustrative form of means for coacting with the rotating electrodes of the apparatus;

Figures 8 and 9 are diagrammatic or fragmentary plan views indicating diagrammatically certain actions on the product or packages to be treated by the electrode structure of Figures 2 and 3;

Figure 10 is a diagrammatic plan view of the stator and rotor and windings of the induction motors that drive the electrodes, showing certain interrelations of these parts; and Figure 11 is a fragmentary side elevation of the stator per se of Figure 10.

Similar reference characters refer to similar parts throughout the several views in the drawings.

Figure 1:
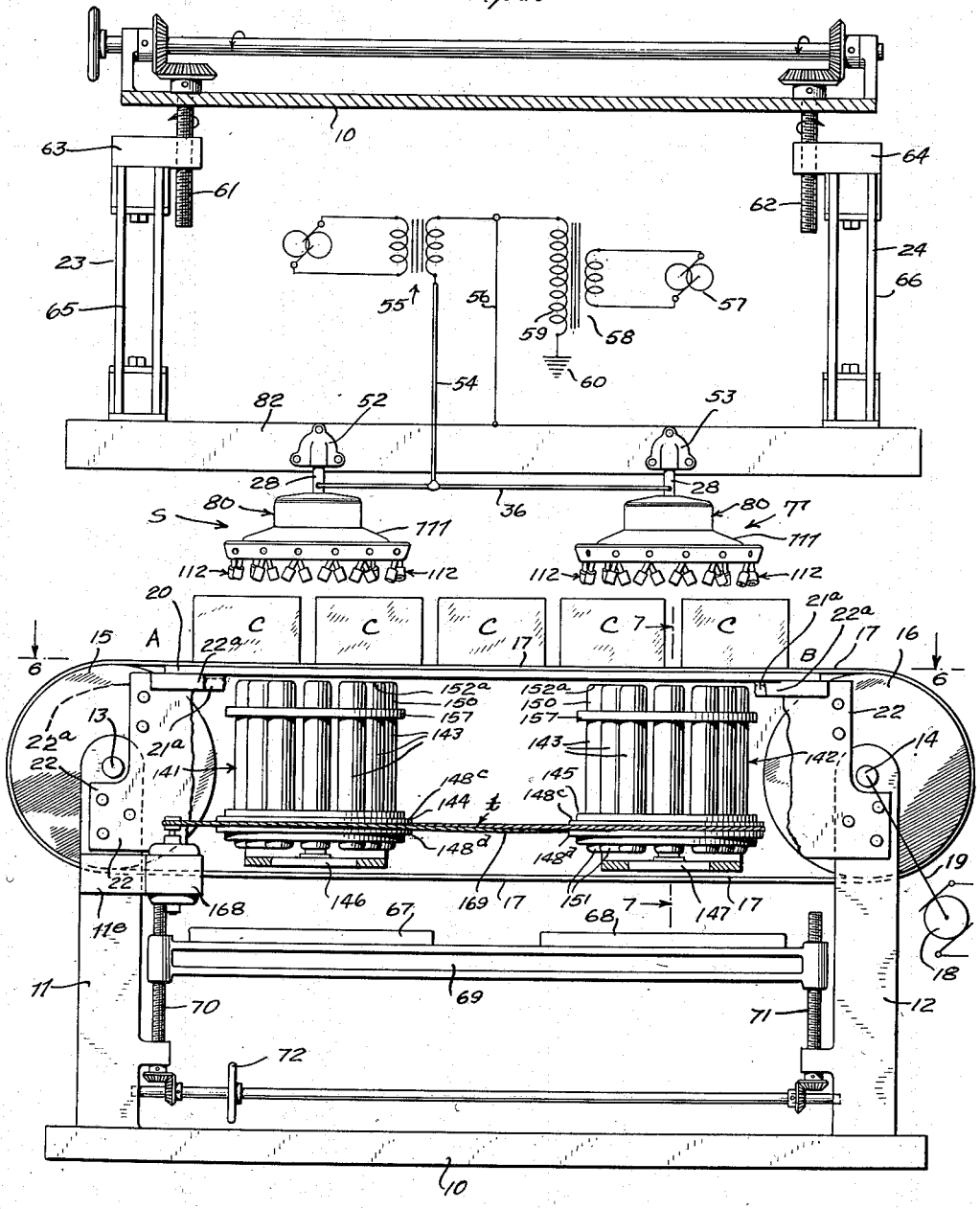
Figure 1 is a front elevation of a possible form of apparatus embodying therein certain features of my invention, for electrically destroying insect life in food products, or the like, certain parts being in Figure 1 shown diagrammatically.

Referring to the drawings and more particularly to Figure 1 thereof, there is indicated diagrammatically a suitable frame 10 provided at its respective ends with appropriate pairs of vertical standards 11 and 12 in which are suitably journaled the shafts 13 and 14 respectively of the drums 15 and 16. About the drums 15 and 16 extends a suitable conveyor belt 17 preferably made of asbestos, canvas, cotton material, or the like.

One of the drums, such as the drum 16, is suitably driven and I have diagrammatically indicated a motor 18 connected to the drum 16 by any suitable transmission diagrammatically indicated at 19 for driving the drum 16 and for thus transmitting motion to the conveyor belt 17. The direction of the drive is preferably such that a tension is put on the upper half of the belt and, as viewed in Figure 1, the motion will be from left to right or illustratively from A to B. Illustratively the rate of drive of the pulley or drum 16 may be such that the movement of the belt 17 takes place at a rate of about 15 feet per minute, but it is not to be understood that this is a limiting rate of drive but that the belt may be driven at any other suitable speed.

The belt 17 is adapted to receive at its left-hand end, as at point A, the material, goods or articles to be sterilized and thus to transport the goods in a direction toward the right and to discharge them at the right-hand end of the belt, as at the point B. Any suitable means, not shown, may be utilized to feed the articles on to the belt and to receive them after they have been discharged therefrom.

Beneath the article-carrying portion of the belt 17 and extending lengthwise thereof is a plate-like member 20 (see also Figures 6 and 7) preferably of a width somewhat greater than the width of the conveyor belt 17. The member 20 aids in preventing the sag of the belt 17 under its load and insures the passage of the material, goods, or articles to be treated along the indicated and prescribed path.

Plate member 20 is made of any suitable solid dielectric material, preferably Pyrex glass, and it extends in a direction lengthwise of the belt throughout a suitable distance. Plate 20 is preferably supported by a pair of laterally spaced and lengthwise extending insulating beams 21a and 22a (see also Figure 6) secured in any suitable manner at their respective ends to the frame 10, being illustratively and preferably secured to the standrads 11 and 12. Beams 21a and 22a are made of any appropriate or suitable solid dielectric material such, for example, as laminated Bakelite, and are preferably given such cross-sectional dimensions as to withstand the vertical stresses to which they are subjected. The cross-section may be, for example, L-shaped or it may be square tubing. Any suitable means may be utilized to secure the supporting plate 20 to its associated insulating beams 21a and 22a.

If desired, the insulating beams 21a and 22a may be mechanically reinforced by the respective side members 21 and 22. These side members are preferably made of a sheet-like solid dielectric material, such as laminated Bakelite. The side members 21 and 22 are preferably secured along their upper edges to the beams 21a and 22a and thus form downwardly extending flanges that offer substantial resistance to bending because of the load carried thereby.

The upper portion of the frame 10 serves to support framework structures generally shown (Figure 1) at 23 and 24 which in conjunction with a longitudinally extending beam 82 serves to support a plurality of electrode structures, illustratively two in number, and generally indicated in Figure 1 at S and T. The electrode structures S and T are merely diagrammatically indicated in Figure 1 and they may take any of the various forms about to be described and the details of which are shown in enlarged scale in other views of the drawings. It is therefore to be understood that any of the electrode structures later herein described in detail may be employed in the apparatus of Figure 1 in which they are to be considered as represented by the diagrammatic representations thereof at S and T. Of these various possible forms of electrode structures, that shown in Figures 2 and 3 may first be considered.

Referring, then, more particularly to Figure 2, there is shown an electrode structure comprising an upper rotatable housing 80 preferably made of a suitable electrically conducting material which may be readily cast, such, for example, as aluminum. The housing 80 has an upper generally cylindrical portion and a lower outwardly and downwardly extending skirt portion 111. The skirt portion 111 is preferably provided with a circle of evenly spaced holes, each of which is adapted to receive an electrode member 112. The various electrode members 112a, 112b, 112c, 112d, etc. are thus arranged in a circle and they are preferably inclined with their lowermost tip portions trailing from their upper portions when the housing 80 is rotated about its central or vertical axis. These electrode members are preferably of identical construction and in Figures 4 and 5 one of them, illustratively member 112a, is shown on an enlarged scale. The electrode member is preferably formed as a piece of hollow conductive tubing having an upper open end portion 113a, the top of which is cut to provide an outwardly extending fin 114a (see Figure 5), the purpose of which is to scoop in air and direct it down through the tip member, as will more fully appear hereinafter. Electrode member 112a terminates in a lower restricted portion 115a. Interfitting with this restricted portion 115a is a tubular jacket 116a (shaped as shown), removably interlocked therewith as, for example, by means of a bayonet joint indicated clearly in Figures 4 and 2.

The electrode members 112 are preferably made of a material, such as aluminum, which is a good conductor of heat as well as electricity and which may be simply and economically produced. The above-described construction lends itself to rapid and economical manufacture.

The tubular jackets are subjected, as will later become clear, to the electric discharge emanating from its lower outer surface portion or the tip end z. Such electrical emanations cause heating, burning and other deteriorating effects unless adequately safeguarded against. To withstand the heavy duty imposed upon the lowermost end portions of the electrode tip members, the tubular jackets are preferably made of a conductor, such as steel, which can withstand the electric discharge emanating from its lower outer surface without undue deterioration and yet which lends itself to rapid and economic production.

In Figure 2, the inclined positioning of the electrode member 112a, and the others as well, with respect to the flanged or skirt portion 111 of the rotatable housing 80 is shown. The electrode housing is driven in such a direction as to cause the electrode members 112a, 112b, 112c, etc. to move through the surrounding atmosphere with their upper end portions 113a, 113b, 113c, etc. leading and their lowermost tip portions z trailing. As may be seen from Figure 5, the electrode members are cylindrical in form, and as positioned in Figure 2, a horizontal cross-section of the electrode member is substantially elliptical in form. This form is of particular advantage in that it gives a stream-line effect in the movement of the electrode member incident to the rotation of the electrode, thus preventing rarified pockets adjacent the tip members and attendant corona formation.

The electrode structure S (see Figures 2 and 3), in addition to the outer rotatable housing 80, includes an inner rotatable housing 120 having a central cylindrical portion from which projects an outwardly and downwardly extending skirt portion 121 and which in general conforms to, but is encompassed by, the skirt portion 111 of the outer rotatable housing 80. The outer periphery of the portion 121 is provided with a circle of holes which are adapted to receive the upper end portions of electrode members 125 which are thus arranged in a circle, being also inclined, and are preferably slanted in a direction opposite to that of the electrode members 112$^a$, 112$^b$, 112$^c$, etc. on the other housing. To simplify construction, the electrode members 125 are preferably identical to the members 112, the details of which have been shown and described above in conjunction with Figures 4 and 5. The electrode housings 80 and 120 with their respective electrode members 112$^a$, 112$^b$, etc. and 125$^a$, 125$^b$, 125$^c$, etc. are adapted to rotate in opposite directions, the purpose of which will appear more fully hereinafter, with their several respective extreme tip end portions z of the electrode members trailing.

Upon rotation of the ring of outer electrode members 112$^a$, 112$^b$, 112$^c$, etc., their respective leading upper end portions 113$^a$, 113$^b$, 113$^c$, etc., having respective air fins 114$^a$, etc., air is scooped in by the various fins above-mentioned and is directed down through the hollow or tubular electrode members and out through the extreme open end portion of their respective jackets 116$^a$, 116$^b$, 116$^c$, etc. Upon rotation of the ring of inner electrodes 125$^a$, 125$^b$, 125$^c$, etc., their respective leading upper end portions 126$^a$, 126$^b$, 126$^c$, etc. having respectively air fins 127$^a$, etc. air is scooped in by the latter fins and is directed down through the respective hollow or tubular electrode members and out through the extreme open end portion of their respective jackets 128$^a$, 128$^b$, 128$^c$, etc. The stream of air passing downwardly through the various electrode members serves to give a cooling effect which augments that produced by the rotation of the ring of tip members. This cooling effect contributes toward negativing the tendency of small particles of metal to separate from the electrode members, particularly from the tip portions z, and hence contributes toward keeping the treatment zone free from such metallic particles.

In addition to the above-mentioned cooling effect, the circulation of air about the electrode members, due to their rotation, and the additional air circulated due to the current of air flowing out of the electrode members contributes toward blowing away from the treatment zone, or space between the electrode members and the belt, any small particles of metal coming off from the electrode tip members and thus prevents the establishment and maintenance of a dynamic arc. Thus the air circulation means employed directly contributes toward maintaining the treatment zone free from extraneous electrical effects which would tend to decrease the efficiency of treatment, detract from the dependability of operation, and which might generally impair the efficiency of the treating apparatus.

As is better shown in Figure 2, the holes in which the electrodes 112 and 125 are seated are formed in the thickened peripheral portions of the above-mentioned skirt portions 111 and 121, respectively, the above-mentioned air fins resting against the upper face of these peripheral portions thus limiting or fixing the position of the electrodes and thus insuring that the active tip ends z thereof fall in the same plane. The electrodes 112 and 125 are held in their respective holes each by a set screw 49, and the upper ends of the electrodes 112 and 125 may be covered over by ring-like plates 50 and 51 secured respectively to the extreme peripheral or flange portions of the portions 111 and 121, respectively. Thus, the assembly and positioning of the electrodes relative to their supports may be readily and quickly achieved and is, moreover, highly dependable.

For illustrative purposes, the outer electrode housing 80 with its associated electrode members 112 may be driven at a speed of 1200 R. P. M. and the inner housing 120 with its associated ring or circle of electrode tip members 125 (having a smaller diameter) is driven at a speed of approximately 1800 R. P. M. With the relative dimensions of the circles formed by the outer electrode members 112 and the inner electrode members 125, as illustratively shown in Figure 3, the peripheral velocities of the two circles of electrode tip members is preferably substantially the same. With the same spacing between electrode members in the outer housing 80 and the inner housing 120, it will be seen that an article passing beneath the electrode structure receives approximately the same number of impulses from each of the oppositely rotating sets of electrode tip members. Such a construction assures a more uniform treatment of the material, articles or other products undergoing treatment as will be more fully described hereinafter.

Considering now more in detail the construction of the driving means for the several sets of electrode members 112 and 125 above-mentioned, it is first to be noted that I prefer to make the housings 80 and 120 each in two parts, and for convenience the construction of housing 80 may first be considered, reference being made now to Figure 2 of the drawings.

One of the parts of housing 80 is the lower portion which comprises a horizontally extending disk-like wall 80$^a$ from whose outer periphery the skirt portion 111 projects downwardly and outwardly and from whose peripheral portion there projects upwardly a cylindrical wall portion 80$^b$ which is counterbored as at 80$^c$ to provide a recess or seat within which the rotor 25 of the motor that rotates the electrode members 112 and which rotor will be more in detail described hereinafter, is seated, being made up preferably of laminations of suitable magnetic material.

The other part or portion of the two-part housing 80 comprises the upper hollow horizontal but slightly downwardly and outwardly inclined top wall portion 80$^d$ peripherally terminating in a downwardly directed cylindrical wall portion 80$^e$ shaped to seat upon the upper face of the cylindrical wall portion 80$^b$ of the other part of the housing 80, suitable screws 26 (Figure 2) securing the two parts together and, it will be noted, acting also to clamp or hold the rotor 25 rigidly in place.

The lower wall portion 80$^a$ (Figure 2) is counterbored as at 80$^f$ to provide a seat for the outer race 27$^a$ of a suitable combined thrust and radial anti-friction bearing generally indicated at 27 whose inner race 27$^b$ is seated against a shoulder 28$^a$ of a vertically extending stud shaft 28.

The uppermost wall portion 80$^d$ is similarly counterbored as at 80$^g$ to receive the outer race 29$^a$ of a suitable combined thrust and radial anti-friction bearing generally indicated at 29, whose inner race 29$^b$ is snugly received about the upper end of the same cylindrical portion of the stud 28 onto which the inner race 27$^b$ of the bearing 27 is fitted.

Intermediate of the bearings 27 and 29 and similarly strung, as it were, onto the stud shaft 28, is the stator 30 of the above-mentioned motor and adapted to coact with the above-mentioned rotor 25. Certain features of the construction are described later but for present purposes it will suffice to say that the stator 30 is made preferably of disk-like laminations of suitable magnetic material, suitably diametered to be received, with adequate clearance, within the annular rotor core 25.

Interposed between the stator 30 and the inner race $29^b$ is a ring or spacer 31 and interposed between the stator 30 and the inner race $27^b$ is a spacer 32, these spacers being likewise strung onto the stud shaft 28. The latter, just above the upper bearing 29, is threaded as at $28^b$ to receive a threaded nut or collar 33, suitably apertured to be manipulated by a spanner wrench, and when this nut 33 is tightened or driven home, the inner race $27^b$, spacer 32, stator core 30, spacer 31, and the inner race $29^b$ are securely clamped between the nut 33 and the shoulder $28^a$, thus dependably holding these parts in assembled relation. Accordingly, with the stud shaft 28 rigidly held in position, as is later described herein, the housing 80 with its rotor 25 and its depending electrodes 112 may freely rotate about the stator 30 and the stud shaft 28.

The stator 30 carries appropriate windings 34, described in more detail hereinafter, and one terminal of the windings 34 is grounded as at 35 to the stator 30 and the other terminal is brought by a contactor 36 through a suitable aperture in the spacer 32 or in the stator 30 or both, and thence through a radial channel $28^c$ in the stud 28 and thence upwardly within the latter through an axially extending channel $28^d$.

The lower or inner electrode housing 120 comprises, as above noted, also two parts; one of these comprises an upper disk-like and generally horizontally extending upper wall portion $120^a$ terminating about its periphery in a downwardly extending cylindrical portion $120^b$ which is counterbored as at $120^c$ to form a seat within which is received and seated the rotor 37, preferably built-up of annular laminations of suitable magnetic material. From the upper disk-like wall portion $120^a$ the skirt portion 121, which carries the electrodes 125 above described, projects outwardly and downwardly under the cover of the skirt portion 111 of the upper housing 80. The extreme peripheral or end portions of the parts 111 and 121, within which are the recesses for receiving the electrodes, terminate preferably in the same horizontal plane though they are of sufficiently different diameters to give the desired spacing between the two sets of oppositely rotating electrodes.

The other part or portion of the two-part housing 120 includes a bottom closing wall portion $120^d$ which extends in a general horizontal direction though inclined somewhat upwardly (Figure 2) terminating peripherally in an upwardly extending cylindrical wall portion $120^e$ which mates with the end of the cylindrical wall portion $120^b$, closing the recess $120^c$ in which the rotor 37 is seated and, when the two parts are secured together as by the screws 38, the rotor 37 is securely clamped or held in place.

The innermost portion of the upper wall portion $120^a$ is counterbored as at $120^b$ to receive the outer race $39^a$ of a combined thrust and radial bearing 39, whose inner race $39^b$ is snugly fitted to the lower portion of the stud 28 but which abuts against the shoulder $28^a$ above-mentioned.

The lower or closed wall portion $120^d$ is counterbored as at $120^g$ to receive the outer race $40^a$ of a combined radial and thrust anti-friction bearing 40, whose inner race $40^b$ is snugly fitted onto the cylindrical part of the stud 28.

Intermediate of the bearings 39 and 40 and also strung onto the shaft 28 is the stator 41, also preferably laminated and hence made up of suitable sheets of magnetic material, such as transformer iron, but with a collar or spacer 42 between the stator 41 and the inner race $39^b$ and a collar or spacer 43 between the stator 41 and the inner race $40^b$.

The lower end portion of the stud 28 is threaded, as at $28^e$, to receive a nut or collar 44 suitably apertured to be operated by a spanner wrench, or the like. Between the nut 44 and the shoulder $28^a$ on the stud 28 the inner race $39^b$, the spacer 42, the stator 41, the spacer 43, and the inner race $40^b$ are securely clamped and held in assembled relation.

The stator 41 is provided with windings 45 one terminal of which is grounded as at 46 and the other terminal of which is carried, as by conductor 47, through an appropriate aperture in the spacer 42 into a radial channel $28^f$ in the stud shaft 28 and thence upwardly in the channel $28^d$ where the conductor is joined to the above-mentioned conductor 36 which merges from the channel adjacent the upper end of the stud 28 by way of a radial passage $28^g$, whence it lies within a keyway-like slot $28^h$.

Thus, the lower or inner housing 120 with its electrodes 125 is mounted for free rotation coaxially with the upper or outer housing 80, the electrodes and their driving means forming a compact unit which may be fixed in position by appropriately securing the stud shaft 28 to a suitable support. The operating parts of the motor or motors are dependably encased and if desired further security of enclosure may be achieved by interposing felt or similar washers 48, seated in appropriate recesses in the hub portions of the casing parts $80^d$ and $120^d$, between the latter and the collars 33 and 44, respectively.

The induction motors within the housings 80 and 120 are preferably constructed to operate at commercially available frequencies, such as 60-cycle alternating current energy and may be constructed to operate at a voltage on the order of 110 volts or 220 volts. The motor within the housing 80 is constructed as a six-pole motor giving a speed of rotation of the housing 80 and hence the electrodes 112 of 1200 R. P. M. The diameter of the circle of the electrodes 125 carried by the housing 120 is less than the diameter of the circle of the electrodes 112 and, to give substantially the same linear speed thereto, the motor within the housing 120 is constructed as a four-pole motor which, at 60 cycles, gives a speed of substantially 1800 R. P. M.

Where the electrode structures S and T of Figure 1 take the form above described in connection with Figures 2 and 3, the studs 28 thereof are secured to the beam 82, which may be metallic, by suitable socket-like brackets 52 and 53 (Figure 1). The conductors 36 that come up through the stud shafts 28 (see Figure 2) may be connected to a common conductor 54 that leads to one side of a suitable source of power current, such as 60-cycle alternating current energy, and illustratively taking the form of a transformer 55. The other side of this source is connected by conductor 56 to the beam 82 to which the other terminals of the windings of the motor or motors within the electrode structures S and T are grounded as was above described in connection with Figure 2, thus completing the supply to the windings of the motor or motors of the driving energy.

The electrodes 112 and 125 are maintained at a high potential, a potential on the order of 150,000 volts, preferably alternating and preferably of relatively high frequency, a frequency, for example, on the order of 640 cycles per second. This potential is supplied by a low voltage high frequency alternator 57 supplying energy to a step-up transformer 58—59, one terminal of the high voltage winding 59 of which is grounded to the frame of the machine as at 60 and the other terminal of which is connected to the supporting beam 82, as by way of the conductor 56. The transformer 55, in this case, is insulated to withstand this high voltage and thus safely to protect the low voltage side and circuit of the transformer 55 against this high voltage. The electrode structures S and T being grounded to the beam 82 or mechanically and electrically connected thereto, are thus maintained at this high potential.

The beam 82, thus also at high potential, supports the structures S and T so that the planes of their electrodes are parallel to the plane of the product-carrying side of the belt 17 and is movably supported by the main frame 10 for adjustment thereof and hence of the electrode structures S and T toward or away from the belt 17. A possible form of adjusting or elevating mechanism is indicated in Figure 1 and it may include the manually controlled elevating screws 61 and 62 whose threaded brackets 63 and 64 are connected to the high potential structure or beam 82 through insulating frames 65 and 66, respectively.

Cooperating with the electrode structures S and T and spaced immediately beneath the upper part of conveyor belt 17 and the insulating sheet 20, there are arranged, preferably in the form of two cylindrical groups 141 and 142 (see Figure 1) substantially coaxially with the electrode structures S and T respectively, a suitable number of preferably identical electronic conduction devices 143. The extreme outside diameters of the cylindrical groups 141 and 142 of these conduction devices are preferably equal to or slightly less than the diameters of the circles traced by the extreme tip portions of the outer rings of electrodes 112 of the electrode structures S and T, where the latter take the form described in connection with Figures 2 and 3, as they are whirled above the conveyor and the product to be treated. The inside diameters of the cylindrical groups 141 and 142 of these conduction devices are substantially equal to or greater than the diameters of the circular paths traced by the extreme tip portions of the inner rings of electrode members 125 of the electrode structures S and T, respectively.

Preferably, the electronic conduction devices 143 are in the form of elongated cylindrical tubes of diameters substantially equal to the distance between the centers of the inner and outer electrodes 112 and 125, and of such length that they are adapted to be conveniently received within the space between the upper and lower sides of belt 17; illustratively the length is five or six times the diameter.

The various electronic conduction devices 143 are maintained in cylindrical groups 141 and 142 spaced from electrode structures S and T respectively, as indicated above, by suitable racks 144 and 145, and their associated supporting yokes 146 and 147, respectively, preferably bolted to the side wall portions 21 and 22 of the conveyor belt supporting framework (see Figure 1).

For reasons of simplicity and economy of construction, the cylindrical groups 141 and 142 of like electronic conduction devices 143 and their associated supporting structures 144—146 and 145—147 are preferably identical so that but the one group 142 and the supporting structures 145—147 is considered in detail.

Referring now more particularly to Figure 7 there is shown at 145 a circular rack preferably rotatably mounted and including illustratively a flat dish-shaped cast aluminum base 148 having a central hub portion 148$^a$ and an outer upturned rim portion 148$^b$, the outer periphery of which is provided with raised circumferential sections 148$^c$ and 148$^d$ to form a sheave, the purpose of which will appear more fully hereinafter.

Preferably made integral with the base 148 and spaced adjacent and including the outer upturned rim 148$^b$ thereof, are a number of individual socket wall portions 148$^e$ which are adapted to receive the lower ends of electronic conduction devices 143 comprising the cylindrical group 142. The interior of the various sockets 148$^e$ is preferably enlarged and adapted to receive a ring 149 of yieldable material, such as felt or rubber, the upper edge of which contacts the lower edge of the inwardly extending rim 148$^f$ or reduced section of the socket which loosely receives an electronic conduction device 143. The ring 149 is forced upwardly against the inwardly extending rim 148$^f$ by a metallic circular band 150 which is loosely received within the socket and which is held in position by a cup-shaped end-cap 151 threaded in the lower slightly enlarged interior of socket 148$^e$.

Each electronic conduction device 143 preferably includes a cylindrical thin-walled glass envelope 152, the upper closed end of which is dented in or recessed as at 152$^a$ lending strength and rigidity to the end closure. Sealed into the lower end 152$^b$ of the glass envelope and preferably axial thereto is an electrode 153 having an enlarged metallic head portion 153$^a$ and a downwardly extending stem portion 153$^b$ of reduced size. The electrode 153 is partially supported by wires 154$^a$ and 154$^b$ in their associated supporting ring portion 154$^c$ conveniently sealed into the protruding end portion 152$^b$ of the glass envelope.

The glass envelope preferably contains one of the noble gases, such as neon, at a pressure of illustratively 6 millimeters of mercury which is adapted to be ionized and rendered highly conductive when subjected to a sufficient high electrical potential gradient, as will more fully appear hereinafter.

The electrode stem 153$^b$ projects through a small hole portion 151$^a$ provided in the end cap 151 where it is bent over and fastened to the end cap by a suitable screw 155 after the electronic conduction device is properly positioned within the socket.

In positioning the electronic conduction device in its socket so that it is firmly held against lateral displacement in spite of slight shocks and jars that may be encountered in actual use, ring 149 of yieldable material is expanded in a radial direction so as to tightly press against the wall of the electronic conduction device adjacent its lower portion by screwing up end cap 151 and forcing the circular band 150 to compress the ring 149 in an axial direction.

To maintain the various electronic conduction devices 143 in upright positions with their axes parallel to the central axis of the cylindrical group 142, a short insulating tubular section 156, preferably of a material such as Dilecto or laminated Bakelite having high electrical insulating properties coupled with mechanical strength, is axially mounted on hub 148a of the base plate 148 and supports the flat circular disk 157 (in a plane substantially perpendicular thereto) of insulating material, such as Dilecto or laminated Bakelite, the central portion of which is recessed as at 157a and adapted to snugly fit a reduced end section 156a of the central tube 156 and be fastened thereto by a suitable pin or set screw 158. The outer rim of disk 157 is provided with a suitable number of spaced hole portions 157b which are adapted to snugly receive the upper portions of the electronic conduction devices.

The recessed lower end of tubular section 156 receives and is attached to Bakelite bushing 159 which snugly fits the outer periphery of hub 148a of base plate 148. Tubular section 156 is attached to bushing 159 by means of screws 160; the rim portion of bushing 159 is attached to base 148 by means of screws 161.

The various electronic conduction devices 143 are adjusted in rack 145 so that their upper closed end portions just clear the lower surface of the solid dielectric plate 20 supporting the upper part of the conveyor belt 17 within the region immediately beneath electrode structure S or T. They are maintained in this position by the stem portion or terminal 153b of the electrode which, as above-mentioned, is brought out and fastened to the end cap 151. The electronic conduction devices are further held in proper position as above-mentioned by the gripping action of the yieldable rings 149 included within each socket.

Rack 145 with electronic conduction devices 143 arrayed in a cylindrical formation about its outer portions, is preferably rotatably mounted on a short upstanding shaft 162, the lower end of which is received within the central portion 147a of an H-shaped yoke, preferably of cast aluminum. The H-shaped yoke is also provided with arms 147b, the ends of which are illustratively crooked upwardly and bolted to the lower edges of the insulating side members 21 and 22 of the conveyor belt supporting structure 20, etc. The central portion of yoke 147a is preferably provided with a raised collar 147c integral therewith, upon the upper edge of which rests a shoulder portion 162a of the shaft 162; permanent connection between shaft and yoke being achieved preferably by horizontal pins 163.

Shaft 162 is provided with an upper reduced portion 162b which receives the inner race 164a of the upper ball bearing assembly 164 preferably of a semithrust construction. The inner race is secured to the shaft by a nut 165 which holds the race against a shoulder portion 162c of the shaft. The outer race 164b of the ball bearing assembly is received within a recessed portion 148g of the hub portion 148a of base plate 148 and is maintained securely therein by end cap 166 which threadedly engages an upper interiorly-threaded portion of hub 148a. End cap 166 is interiorly cupped so as to permit free movement with respect to nut 165 and the upper end of shaft 162. Shaft 162 is provided with an additional reduced portion 162d upon which is mounted the inner race 167a of the ball bearing assembly 167 in a pressed-fit relation, the outer race 167b of which is tightly received within a recessed portion 148h of the hub portion 148a of base plate 148.

Ball bearing assembly 167 preferably has semithrust characteristics and sustains part of the weight of the array of electronic conduction devices and their supporting rack 145; the upper end of recessed portion 148h resting directly on the upper edge of the outer race 167b of the lower ball bearing assembly. Lower ball bearing assembly 167 is preferably rendered dust-tight and grease-tight by a dust ring 167c preferably including a felt ring, the inner periphery of which rides upon the outer periphery of the inner race 167a of the ball bearing assembly, and the outer periphery of which is preferably received within a recessed portion of the outer race 167b and maintained tight in this position by a spring ring seated within in a circumferential groove.

Thus, the cylindrical array of electronic conduction devices is securely supported and adapted to be rotated about an axis coincident with the axis of rotation of an electrode structure and with the extreme upper ends of the electronic devices moving in a common plane substantially parallel to that of the extreme tip portions of electrode members 112 and 125 and to the upper conveying surface of belt 17.

It may at this point be noted that the above-described rack and rotatable mounting therefor permits a maximum length of electronic conduction device between upper and lower sides of belt 17, or for a desired size and length of electronic conduction device enables a minimum size of driving and driven pulleys 15 and 16, respectively; the lower side of belt 17 passes in a return direction just clear of the lowermost portions of the supporting yoke 147 to permit a generally compact and rigid construction which, furthermore, is extremely light in weight and well adapted to be supported by the light insulating conveyor belt supporting structure.

As mentioned above, the cylindrical array 141 of electronic conduction devices 143 mounted in rack 144 and supported by yoke 146 are preferably of identical construction to the cylindrical array of electronic conduction devices 143 mounted in rack 145 and supported by yoke 147, all as more particularly described above.

The electronic conduction devices or gaseous conduction devices thus constructed are preferably rotated in opposite directions conveniently by an electric motor 168 illustratively of the single phase induction type which is conveniently bolted to an outwardly projecting arm portion 11e preferably made integral with the upstanding support 11.

Mechanical driving energy is conveniently transmitted to electronic conduction device rotor assemblies 141—144—146 and 142—145—147 by a belt 169 of high electrical insulating characteristics, such as a cotton fabric, which is received within sheaves or circumferential groove portions of racks 144 and 145, the detailed construction of which is more particularly set forth above, the belt preferably crossing over at a point t between the rotor assemblies so as to rotate them in opposite directions.

Motor 168 is preferably driven (upon being energized in a manner described more fully hereinafter) in a counter-clockwise direction, looking downwardly on the motor as seen in Figure 1, and transmits motion by belt 169 to electronic conduction device rotor assemblies 141—144—146 and 142—145—147 in counterclockwise and clockwise directions, respectively.

The rotation of the electronic conduction device rotor assemblies is preferably relatively slow giving them a peripheral velocity of about 500 feet per minute. The advantages of rotating the electronic conduction device rotor assemblies will appear more fully hereinafter in considering certain electrical actions and effects on the product to be treated as it is conveyed through the region between the rotating electrodes maintained at a high electrical potential and their respectively associated electronic conduction device rotor assemblies.

Under operating conditions of the treating apparatus electronic conduction devices 143 become ionized, in a manner more fully described hereinafter, and emit a dull red-orange glow (for neon) indicating that the tube is functioning properly. In order that the devices may be observed, the downwardly extending side members 21 and 22 of the conveyor belt supporting structure are provided with apertures (not shown) adjacent electronic conduction device rotor assembly 141—144—146 (see Figure 1) and apertures 21c and 22c (Figure 7) adjacent electronic conduction device rotor assembly 142—145—147.

A defective electronic conduction device may be readily detected by an absence of the above-mentioned glow of the device and a replacement of the defective electronic conduction device may then be made. In effecting the replacement of an electronic conduction device 143, the edge of the lower side of conveyor belt 17 immediately beneath the defective device is pushed clear of the space immediately beneath the particular socket supporting the defective device; the belt being of such length and physical characteristics as to permit the distortion indicated.

End cap 151 associated with socket 148b—148e (see Figure 7) holding the defective device 143 is then unscrewed from the lower portion of the socket and tube 143 is withdrawn or pulled down through the socket and taken out beneath the conveyor belt supporting structure, sufficient working space being provided between the arms of yoke 147. A replacement of the defective electronic conduction device is effected in a substantially reverse order, care being taken, as mentioned above in connection with the initial mounting of the electronic conduction devices in their respective sockets, that the upper end of the replaced device be properly spaced from the solid dielectric sheet 20. Thus, a defective conduction device may be readily detected and quickly and effectively replaced with a minimum expenditure of effort and with a minimum shut-down of the apparatus, all with a minimum change, alteration or disturbance of other parts of the apparatus.

As mentioned above, the lower base plates of the racks supporting the various electronic conduction devices are preferably made of metal, as well as the supporting shafts, bearings and yokes, so that paths of good electrical conductivity are provided from the various electrodes of the electronic conduction devices, through the parts above-mentioned including the electrically conductive metallic end caps to which the electrodes are directly connected.

Referring to Figure 1, desirably underneath conveyor belt 17 are positioned two condenser plates 67 and 68. In this embodiment these plates are made of sheet metal and have a dimension crosswise of the belt in excess of the width of the belt itself or the width of the plate 20. The lengths of the condenser plates 67 and 68 are somewhat in excess of the respective lengths of the treatment zones along the belt; preferably the condenser plates 67 and 68 are made substantially square (see Figure 6).

The condenser plates 67 and 68 are preferably mounted in a common plane, the plane of each being substantially parallel to that of the tips of the electrode structures S and T, respectively, and the plates are mounted in any suitable manner so that they may be moved in a vertical direction and without being shifted in their axial relation with respect to the electrode structures S and T. An illustrative form of mounting is shown in Figure 1 and it will be seen to include a cross-beam support 69 upon which the plates 67 and 68 are directly mounted. The member 69 is preferably of such a material, for example iron or steel, which lends suitable mechanical support to the condenser plates 67 and 68 and which also serves as an electrical conducting member between the plates and the frame. The cross-beam 69 includes the threaded brackets which respectively engage suitable elevating screws 70 and 71 suitably journalled in standards 11 and 12.

The elevating screws 70—71 may be conjointly controlled as by a hand-wheel 72 suitably geared to the screws, as shown in Figure 1, and thereby the condenser plates 67 and 68 may be positioned appropriately with respect to the electronic conduction devices above described and also with respect to the electrode structures S and T.

The product to be treated, illustratively flour, milled cereal, or the like, and illustratively packaged and hence indicated at C in Figure 1, is, as above noted, moved by the conveyor 17 in a direction from the left to the right and hence it enters first the treatment zone under the electrode structure S and then the treatment zone under the electrode structure T, a corona-like discharge emanating from the tips z of the oppositely rotating rings or circles of electrodes 112 and 125 (see Figures 2 and 3) in each of the electrode structures S and T, accompanied by actions already briefly described in connection with the structure of Figure 2; this corona-like discharge impinges upon the belt 17 or upon the dielectric plate 20 that supports the belt, and due to the number of the electrode members and their relatively high rate of movement, as well as due to the high frequency of the potential applied to them, the corona discharge that emanates from each circle of electrodes is in the form substantially of an annulus of innumerable and apparently dense mass of fine corona streamers. The lower portions of these annuli are controlled and prevented from spreading or straying by the action of the electronic conduction devices 143 above described, the action of which, moreover, due to their movement or rotation as above described, is uniformly distributed throughout the general circle which their upper ends define.

This action is important in achieving rapid and efficient sterilization. When a product which is being treated is passing through the treatment zone the concentration of flux and the movement of the electrodes results in thorough sterilization of the product. As will be explained below in connection with Figures 8 and 9, the corona discharge is directed to every portion of the article as it passes through the apparatus.

In the above-mentioned annuli of concentrated local rupture or corona discharge, the articles or materials to be treated are moved by the continuously moving belt 17. The material, having a higher average permittivity than the air dielectric through which the local rupture had been taking place, brings about a redistribution of the voltages in the paths leading from the electrode tips 112 and 125 to the condenser plate 67 (or 68) and in fact causes a still greater and more intense concentration of the local rupture and also an earlier rupture (because it is made to occur at a lower point on the voltage wave) than had been previously taking place.

The air dielectric intervening the spaces in the particles of the material, such as the grains of corn meal, is quickly ionized and is, in fact, overstressed to a greater extent than the air dielectric between the electrode tips $z$ of electrodes 112 and 125 and the plate 20 because of this intervening air dielectric having a low permittivity, namely unity, while the average permittivity of the individual particles of the material is higher than that of air. Hence the local rupture or corona takes place within and throughout the material and, because the contaminating insect life has a substantially infinite permittivity and is in effect electrically conducting, this insect life is sought out by the corona streamers which pass therethrough and thus bring about its destruction.

The uniform current density, toward the achievement of which the electronic conduction devices 143 contribute, aids materially in achieving effective and uniform destruction of insect life.

If the material is packaged as, for example, in pasteboard cartons or packages, the above-described actions likewise take place but are accompanied by a further action which prevents puncturing of the material of the carton. The pasteboard or paper or like material of the package has an average permittivity that is higher than the air which, prior to the entry of the package into the treatment zone, constituted the dielectric between the electrode structure S (or T) and the plate 20 (see Figure 1). More particularly, the walls of the carton or package act as condenser dielectrics which become serially related with the dielectrics of the fixed and variable capacities otherwise in the circuit. The resultant redistribution of voltages throughout the thus newly and serially related condenser dielectrics is such that the voltage gradient across the material of the carton is below the puncturing gradient and hence puncturing of the material of the carton is positively precluded.

The solid dielectric (member 20) of the above-mentioned fixed capacities also functions to protect the electronic conduction tubes 143 against puncture of the glass envelopes thereof and I am thus enabled to avoid the disadvantages that might accompany the use of electronic conduction devices of otherwise adequately thick walls. In the absence of such protective means, the walls of the tubes 143 would have to be made relatively very thick with the result that it would be difficult to achieve a sufficient homogeneity of current density at the bottom of the corona annuli because in turn the gas columns could not be sufficiently closely spaced.

Another action that comes into play and contributes toward the achievement of the above-described results and advantages is the condenser action between the plate members 148 and 67 (Figure 1) in the circuit of the treatment zone under electrode structure S and between the plates 148 and 68 in the circuit of the treatment zone of the electrode structure T; these are virtually air condensers and they are dimensioned, as by maintaining the spacings between the plates thereof sufficiently great, so that each of itself can withstand the total or maximum high potential of its own circuit without breakdown or rupture, and thus spark-over or complete rupture in the circuit of either electrode structure S or T is prevented. Furthermore, by varying the spacing of the rotating electrodes from the belt 17, I may control the intensity of the individual corona streamers to suit them to the particular conditions to be met with in practice.

But an action comes into play because of the character and/or movement of the corona streamers emanating from the two oppositely moving or rotating sets of electrodes 112 and 125, this action being identical in the two structures S and T and repeated; in fact, because of this feature of action, I am enabled to dispense entirely with one treatment zone and hence utilizing only one electrode structure (S or T) with the corresponding control means, such as only one cylindrical group 141 of tubes 143 and one condenser, such as the air condenser formed between the parts 148 (Figures 7 and 1) and the condenser plate 67. In Figures 8 and 9 I have diagrammatically shown, by circles made up of arrows, the directions of movement of the sets of electrodes 112 and 125, and four successive positions of the same package C as it is moved in the direction from A to B and hence from left to right.

Because of the tendency of the corona discharge emanating from the moving electrodes of the structure S (or T) to persist particularly along the outside surfaces of the side or end walls of the package C when, due to the direction of movement of the electrodes, the discharge is moved, as viewed in Figures 8 and 9, toward the package, and because of flux refraction and like factors brought about by the action of the paper or pasteboard or like dielectrics of which the carton is made, there is a tendency for the corona discharge not to take place in regions of the material within the package closely adjacent to that exterior side or end wall of the package onto which the discharge has just been wiped or swept.

For example, at the left of Figure 8 note how the electrodes 112 sweep the discharge downwardly (as viewed in that figure) with respect to the upper side wall; accordingly, there is a region or portion of the material adjacent that side wall that is likely to be insufficiently treated, but in the region adjacent the lower side wall of the package in the left-hand position in Figure 8, that action does not take place and the material is thoroughly sterilized.

However, as the package continues to move from the left to the right, it strikes the oppositely moving effects of the inside ring of electrodes 125, and the discharge from the latter acts in a reversed manner, namely, while it may not thoroughly act upon the material adjacent the lower side wall of the package (that being now not necessary since that portion was thoroughly treated by the ring of electrodes 112) it does, however, completely permeate and penetrate all portions of the material adjacent the upper side wall (the portion or region that was likely to be insufficiently treated by the discharge from the electrodes 112).

As the package continues to move toward the right and progressively into and through the right-hand portion of Figure 8, these actions are again reversed, and thus double certainty of complete sterilization is achieved, it being understood that similar actions as above described take place with respect also to the leading and trailing vertical or end walls of the package. Figures 8 and 9, therefore, indicate diagrammatically successive positions of the same package with respect to the oppositely moving concentric rings of electrodes and show how the possible deficiencies of one set of electrodes with respect to material immediately inside of a particular vertical wall of the package are remedied by the action of the other of the concentrically moving electrodes.

As all these actions take place, the air being scooped up by the vanes 114ª (Figures 2, 4 and 5) is projected downwardly through the orifices or nozzles 115ª, not only with actions already above described, but also thereby blowing out of the treatment zone ionized air or air remaining ionized when, in a voltage wave or pulsation, the instantaneous discharge has ceased. This action is important because it makes sure that, upon the next voltage wave or impulse, the local rupture or corona discharge takes place on a higher point of the voltage wave.

As earlier above noted, various forms of electrode structures may be employed and I have pointed out how, with the unique arrangement of Figures 2 and 3, I may utilize only one treatment zone instead of the two, as shown in Figure 1. However, I may achieve other advantages and results of my invention by using for the electrode structure S only one of the rings of electrodes of Figures 2 and 3 and its corresponding motor drive. In such case I employ two electrode structures S and T, but drive them in opposite directions, thereby providing two laterally spaced treatment zones in which the actions, with respect to packaged material, are reversed and thus complete sterilization insured.

The windings of the motors employed in the structure shown in Figure 2 may take the form shown in Figures 10 and 11 in which the stator is, as above noted, slotted to receive the various coils W1, W2, W3, W4, etc., connected serially and also to the other circuits, as already above described. The rotor may have a winding of the squirrel cage type, known in the art, and indicated in Figure 10 by the cross-conductors K connected to the spaced rings P (see also Figure 2). The periphery of the stator may also be slotted and set into the slots, closed circuit coils X (Figure 11) acting as shading coils to give the motor appropriate starting characteristics.

The rotating cylindrical groups 141 and 142 of conduction tubes 143 coact in achieving the above-described actions of the rotating electrode structures S and T and coact also in achieving the results above described in connection with Figures 8 and 9. They insure uniform density of discharge in the treatment zones and also uniform distribution of the corona streamers throughout the annulus or annuli of discharge emanating from the rotating ring or rings of electrodes.

It will thus be seen that there has been provided in this invention an apparatus in which the various objects above described, together with many thoroughly practical advantages, are successfully achieved.

As many possible embodiments may be made of the above invention and as many changes might be made in the embodiment above set forth, it is to be understood that all matter hereinbefore set forth or shown in the accompanying drawings, is to be interpreted as illustrative and not in a limiting sense.

I claim:
1. In electrical treating apparatus of the type wherein a high potential is impressed across a pair of electrodes to produce discharges within a treatment zone, in combination, a source of high potential, capacity-forming means connected thereto and including two opposed rotating electrode means having adjacent effective discharge-controlling portions of substantially matching effective area with a treatment zone therebetween, one of said electrode means comprising two coaxial electrode members rotating in opposite directions, and means for moving a product through said treatment zone.

2. In electrical treating apparatus of the type wherein a high potential is impressed across a pair of electrodes to produce discharges within a treatment zone, in combination, a source of high potential, capacity-forming means connected thereto and including two opposed rotating electrode means having adjacent effective discharge-controlling portions of substantially matching effective area with a treatment zone therebetween, one of said electrode means comprising two coaxial ring-like members, each having a plurality of discharge electrodes directed toward the other electrode means, means for rotating said ring members in opposite directions, and means for moving a product through said treatment zone.

3. In electrical treating apparatus of the type wherein a high potential is impressed across a pair of electrodes to produce discharges within a treatment zone, in combination, a source of high potential, capacity-forming means connected thereto and including two opposed rotating electrode means having adjacent effective discharge-controlling portions of substantially matching effective area with a treatment zone therebetween, one of said electrode means comprising two oppositely rotating electrode members, and the other electrode means comprising electronic conduction means, and means for moving a product through said treatment zone.

4. In electrical treating apparatus, in combination, a source of high potential, capacity-forming means connected thereto and including a movable electrode structure and means juxtaposed thereto for coaction therewith for producing an electric discharge within a treatment zone, means for moving a product through said treatment zone, said electrode structure having a discharge electrode and means responsive to the movement of said electrode structure for effecting a blast of air current lengthwise of said electrode.

5. In electrical treating apparatus, in combination, a source of high potential, capacity-forming means connected thereto and including a movable electrode structure and means juxtaposed thereto for coaction therewith for producing an electric discharge within a treatment zone, means for moving a product through said treatment zone, said electrode structure having a tube-like electrode and vane-like means responsive to movement of said electrode structure for scooping air into said discharge electrode.

6. In electrical treating apparatus, in combination, a source of high potential, capacity-forming means connected thereto and including a movable electrode structure and means juxtaposed thereto for coaction therewith for producing an electric discharge within a treatment zone, means for moving a product through said treatment zone, said electrode structure having an electrode projecting therefrom and said electrode having an effective discharge-emanating portion removably secured thereto.

7. An apparatus like that of claim 1 in which there are means for moving ionized air out of the discharge zones.

8. An apparatus like that of claim 1 in which the two coaxial electrode members are carried respectively by motive means, the rotating elements of which rotate in opposite directions.

9. An apparatus like that of claim 1 in which the two coaxial electrode members are carried respectively by two rotating housings, one of which is reentrant and receives therein the other, and means within the housings for effecting their rotation.

10. An apparatus like that of claim 1 in which the two coaxial electrode members are rotatably supported by a common stationary support, the latter carrying driving means effecting opposite directions of rotation of said coaxial electrode members.

11. An apparatus like that of claim 1 in which the coaxial electrode members rotate about a common stationary support, and means rotatably supporting them with respect to said support.

12. An apparatus like that of claim 1 in which the coaxial electrode members are supported by a common supporting means, the latter carrying the stationary elements of two motive means, and rotatably supporting the rotatable elements of said motive means, and means connecting the rotating elements respectively to said electrode members.

13. An apparatus like that of claim 6 in which the removable portion is secured to the electrode by a bayonet joint.

14. An apparatus like that of claim 6 in which the electrode structure is of sheet metal tubing.

15. An apparatus like that of claim 6 in which the discharge-emanating portion is made of sheet metal.

16. An apparatus like that of claim 3 in which the electronic conduction means has an effective portion juxtaposed to the two oppositely rotating electrode members that defines an annular area commensurate with the annular area defined by the rotating electrode members.

17. An apparatus like that of claim 3 in which the electronic conduction means comprises a plurality of electronic conduction tubes arranged substantially in a cylinder.

18. In electrode structure of the type used in treating apparatus, in combination, a stud-like supporting member having mounted thereon and spaced axially therealong two stationary elements of two motive means, two frame-like members each carrying a rotatable element for coaction with one of said stationary elements of said motive means, thereby to complete the latter, means rotatably supporting said frame-like members from said stud-like member and for thereby positioning said rotary elements in co-acting relation to said stationary elements respectively, and electrode means carried by each of said frame-like members at respectively different distances from the common axis of rotation of said frame-like members.

19. A construction as claimed in claim 18 in which the means rotatably supporting said frame-like members is in the form of bearings alternated along said stud-like member with said stationary elements, said stud-like member carrying clamping means for clamping said bearings and said stationary elements therebetween and for thereby securing them to said stud-like member.

20. A construction as claimed in claim 18 in which one of said frame-like members is reentrant and receives therein the other frame-like member, said electrode means on each being of substantially the same length, said frame-like members having means lying in substantially the same plane transversely to the axis of said stud-like member for supporting said electrode means.

21. A construction as claimed in claim 18 in which the means rotatably supporting said frame-like members is in the form of a plurality of antifriction bearings having inner and outer races, said inner races being strung along said stud-like member and alternated with said stationary elements of said two motive means, said outer races being respectively secured to said two frame-like members and said stud-like member carrying means for clamping said inner races with said stationary elements therebetween and for thereby securing them to said stud-like member.

22. A construction as claimed in claim 18 in which the two motive means are electromotive means, the stationary and rotatable elements thereof having coacting windings which, when energized from a suitable source of electrical energy, effect rotation of said rotatable elements and hence of said frame-like members with respect to said stationary elements, said stud-like member having extending therealong channel means, and electrical conductor means along said channel means and leading to said windings whereby, when said conductor means is connected to a suitable source of electrical energy, said windings may be energized.

23. A construction as claimed in claim 18 in which that motive means that drives the frame-like member that carries the electrode means at a larger distance from the said common axis than the distance at which the other electrode means is carried by the other of said frame-like members is constructed to drive its frame-like member and hence its electrode means at a lower R. P. M. than the R. P. M. of drive of the other frame-like member by its motive means.

24. A construction as claimed in claim 18 in which the said two motive means are in the form of alternating current induction motors, the respective stationary and rotatable elements thereof carrying appropriate windings, the windings of that motive means that drives the frame-like member that carries the electrode means at a greater distance from said common axis than the other having more poles than the windings of the other electromotive means in order that the former rotates at a lower R. P. M. than the latter.

25. In electrical treating apparatus of the type wherin a high potential is impressed across a pair of electrodes to produce discharges within a treatment zone, the combination of, a shaft structure, two electrode structures independently mounted upon said shaft structure and adapted to rotate about a common axis, stator means mounted upon said shaft structure, and independent rotor means associated with each of said electrode structures and with said stator means to impart independent rotation to each of said electrode structures.

26. An electrical treating apparatus of the type wherein a high potential is impressed across a pair of electrodes to produce discharges within a treatment zone, the combination of, a shaft structure, a plurality of motor-electrode structures rotatably mounted in alignment upon said shaft structure, and electrode means carried by each of said motor-electrode structures, each of said motor-electrode structures including a casing shell enclosing a motor having a stator rigidly mounted upon said shaft structure and a rotor carried by said casing shell.

27. In electrical apparatus of the type wherein a high potential is impressed across two electrode structures having opposed faces with a discharge zone between said faces, the combination of, an electrode structure positioned upon one side of the treatment zone including two annular electrode means mounted to rotate independently about a single axis, and means to rotate said two annular electrode means in opposite directions.

28. In electrical apparatus of the type wherein a high potential is impressed across two electrode means having opposed faces with a discharge zone between said faces, the combination of an electrode means including two electrode members mounted upon a single axis and means adapted to rotate said two electrode members in opposite directions upon said axis, said last-named means including a fixed stator upon said axis and a rotor mounted upon one of said electrode members, said electrode means including a shell encasing said stator and said rotor.

29. In electrical apparatus of the type wherein a high potential is impressed across two electrode means having opposed faces with a discharge zone between said faces, the combination of an electrode means including two electrode members mounted upon a single axis and means to rotate said two electrode members in opposite directions upon said axis, said last-named means including a fixed stator upon said axis and a rotor mounted upon one of said electrode members, said electrode means including a shell encasing said stator and said rotor, said electrode means adapted to cause air to circulate through said discharge zone.

FRANKLIN S. SMITH.

CERTIFICATE OF CORRECTION.

Patent No. 2,132,703.　　　　　　　　　　October 11, 1938.

FRANKLIN S. SMITH.

It is hereby certified that error appears in the printed specification of the above numbered patent requiring correction as follows: Page 4, first column, line 69, for the reference character "120$^b$" read 120$^f$; page 10, second column, line 70, claim 26, for "An" read In; and that the said Letters Patent should be read with this correction therein that the same may conform to the record of the case in the Patent Office.

Signed and sealed this 29th day of November, A. D. 1938.

Henry Van Arsdale (Seal)　　　　　　　　　　　　　Acting Commissioner of Patents.